Sept. 20, 1971   H. J. GIRARD   3,605,159
PIPE LINE PIG OR SWIPE

Filed Nov. 20, 1968   2 Sheets-Sheet 1

Harry J. Girard
INVENTOR

BY Charles E. Lightfoot
ATTORNEY

Sept. 20, 1971    H. J. GIRARD    3,605,159
PIPE LINE PIG OR SWIPE
Filed Nov. 20, 1968    2 Sheets-Sheet 2

Harry J. Girard
INVENTOR

BY
Charles E. Lightfoot
ATTORNEY

United States Patent Office 3,605,159
Patented Sept. 20, 1971

3,605,159
PIPE LINE PIG OR SWIPE
Harry J. Girard, 3202 Huntingdon,
Houston, Tex. 77019
Filed Nov. 20, 1968, Ser. No. 777,448
Int. Cl. B08b 9/04
U.S. Cl. 15—104.06               1 Claim

ABSTRACT OF THE DISCLOSURE

A pig or swipe for use in cleaning pipe lines and for maintaining fluids separated while being transmitted through the line, and adapted to be propelled through the line by a pressure gradient therein. The pig includes a sponge-like body of foamed plastic material, having an external coating or cover of durable material, such as unfoamed plastic in which reenforcing material, such as wire mesh or glass fabric may be embedded to increase resistance to tearing and wear. The covering is applied to leave openings through which the sponge-like body may project into wiping contact with the surrounding internal surface of the pipe when a longitudinal compressive force is exerted on the pig by the fluid in the pipe in advance of and following the pig therein. The pig also has a barrier layer at one end positioned to close the sponge-like body against the passage of fluid therethrough and to form a fluid tight seal with the surrounding pipe.

BACKGROUND OF THE INVENTION

In the operation of pipelines it has become customary to clean such lines by propelling a pig or swipe therethrough by a pressure gradient. Such pigs or swipes are also used to maintain separate products of different kinds which are to be transmitted through the line.

Pipe line pigs or swipes for this purpose are made of resilient material, such as foamed plastics, such as polyurethane, of suitable diameter to be tightly fitted into the pipe and of sufficient flexibility and compressibility to pass about curved sections or bends in the pipe and through restricted portions of the same due to irregularities in the shape of the pipe, while maintaining a fluid tight seal therewith. Because of their more or less sponge-like character, such pigs or swipes are often provided at one end with a barrier layer or cover, which precludes the passage of fluid through the pig in use, so that the fluids on opposite ends of the pig in the line do not become mixed. Various kinds of coating or coverings are also sometimes applied peripherally about the pigs or swipes in position for engagement with the surrounding wall of the pipe to wipe or scrape the same while forming a protective covering for the soft material of the body of the pig. Peripheral coverings of this kind may take the form of strips of thin plastic material, or the like, spirally applied to the exterior of the pig, or a layer of suitable covering material, such as plastic, having spaced apart openings therethrough through which the sponge-like material of the body may extend into wiping engagement with the surrounding wall of the pipe when the pig is subjected to the pressure of fluids in the line on the opposite ends of the pig.

As heretofore commonly constructed pipe line pigs of this kind are of relatively soft sponge-like character which become torn and abraded by contact with internal irregularities in the pipe line, such as deposits formed by internal dripping of weld metal at welded joints, inwardly protruding edges produced by poorly fitted abutting ends of pipe sections where connected together, or other internal projections and irregularities, so that the pigs are rapidly worn or at times practically disintegrated and rendered useless for the purpose. Moreover, it has been found difficult to provide an external coating or cover for the foamed plastic material of the pigs which will have sufficient flexibility to permit the pigs to conform to the shape of restrictions or bends in the pipe, while at the same time having sufficient durability to resist tearing and abrasion from contact with such internal irregularities.

In some instances pigs or swipes of this character have been provided with a coating or cover over the entire external area of the body, but the performance of such pigs is unsatisfactory since the pressure of fluid in the pipe acting throughout the surface of the covering causes an overall reduction in the size of the pig, thus allowing leakage past the pig and at times resulting in a permanent shrinking or puckering of the pig which renders it useless in operation.

The present invention has for an important object the provision of a pipe line pig or swipe of improved construction, which is of flexible, resilient character capable of conforming to the shape of restricted portions and bends in the pipe line and embodying reenforcing means on the exterior of the pig by which the same is rendered highly resistant to tearing and abrasion without reducing its flexibility and resiliency.

Another object of the invention is the provision of a pipe line pig or swipe of sponge-like character, such as foamed polyurethane, having an external covering of relatively durable flexible material such as unfoamed plastic within which a reenforcing means is embedded.

SUMMARY OF THE INVENTION

Briefly described the pig or swipe of the invention comprises a generally cylindrical body of sponge-like, foamed plastic, such as polyurethane, having a barrier layer at one end, formed of more durable, unfoamed plastic closing such end of the body against the passage of fluid therethrough and positioned for sealing engagement with the surrounding internal surface of the pipe. The pig also has an external covering about its periphery formed of durable, unfoamed plastic, in which reenforcing material, such as wire mesh, or glass fabric may be embedded, and having openings through which the sponge-like body may protrude into wiping contact with the internal surface of the pipe upon longitudinal compression of the pig by a pressure gradient in the pipe.

The pig, thus constructed, is adapted to be propelled through a pipe line by a pressure gradient therein, and has sufficient flexibility to pass readily through portions of irregular shape in the line and about bends therein, while allowing longitudinal compression of the pig without permitting the passage of fluid thereby. Due to the durable, reenforced outer covering, the pig is resistant to tearing or undue wear caused by engagement with roughness or internal protrusions, such as weld deposits in the pipe.

DETAILED DESCRIPTION OF PARTICULAR EMBODIMENTS OF THE INVENTION

Figure 1:
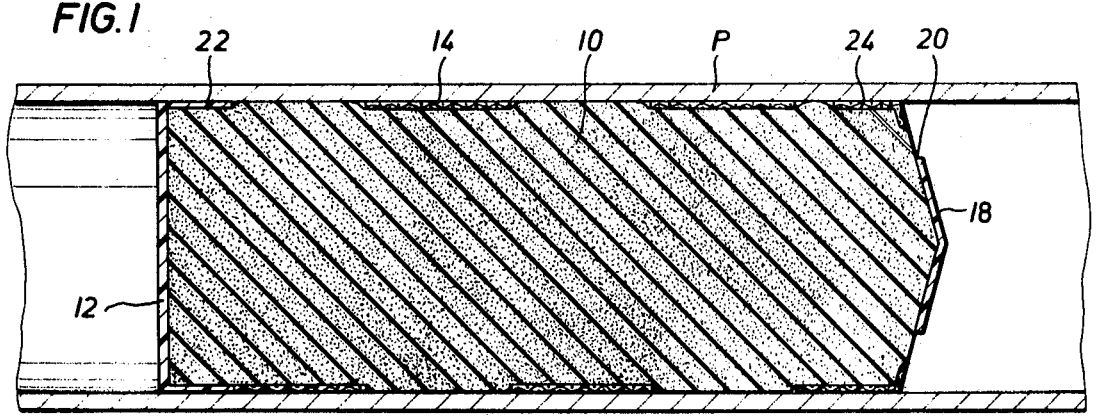
FIG. 1 is a longitudinal, central, cross-sectional view illustrating a preferred embodiment of the pipe line pig of the invention and showing the same in position in a pipe line.

The pipeline pig or swipe of the invention may take the form of a generally cylindrical body 10 of suitable resilient, flexible material, such as foamed plastic of sponge-like character. The body is somewhat larger in diameter than the internal diameter of the pipe in which it is to be used, so that the pig must be compressed in inserting it into the pipe line to form a tight fit therein, and the body may be suitably elongated.

At one end the body is provided with a barrier layer or cover portion 12, of flexible material, such as unfoamed polyurethane plastic, or the like, which is positioned to close the end of the body and to form a fluid tight seal with the surrounding wall of the pipe to prevent leakage of fluid past the pig during the propelling of the same through the pipe line by a pressure gradient therein. This barrier layer may form a part of an external, peripheral cover or coating about the exterior of the body, extending substantially from end to end thereof and which may take the form of a spiral strip 14 of suitable plastic material, leaving a spiral opening 16 between the turns of the strip, through which the material of the body may expand into engagement with the surrounding wall of the pipe, as shown in FIG. 1, when the pig is subjected to a pressure gradient in the line to compress the pig longitudinally therein.

The pig may also have an end cap portion 18 at its other end, which is of substantially smaller diameter than the body to leave an opening 20. At the ends of the body the external covering may be formed with annular portions 22 and 24 extending entirely about the periphery of the body, as seen in FIG. 2.

Figure 3:
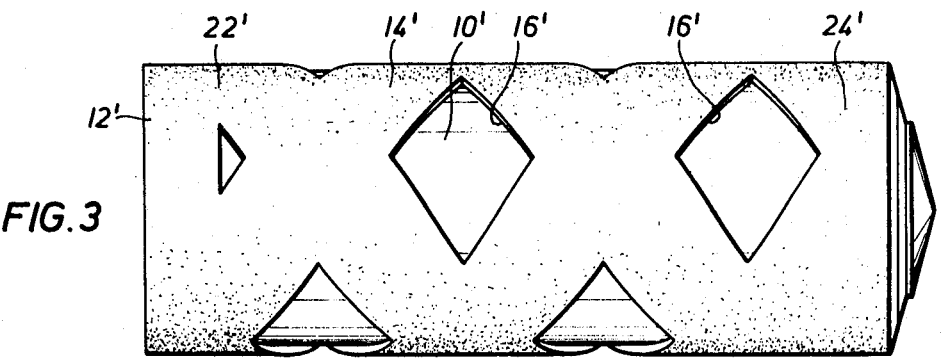
FIG. 3 is a view similar to that of FIG. 2, illustrating a somewhat different modification of the invention.

A somewhat modified form of the pig or swipe of the invention is illustrated in FIG. 3, wherein the external covering 14' is shaped to form more or less polygonal, or diamond shaped openings 10' in place of the spiral opening 10. In this form of the device the external covering may be applied as a single layer, or, if desired, may be formed of separate strips of plastic material wound spirally about the body in opposite directions to form a criss-cross pattern providing the openings 10'. The covering is also formed with annular portions 22' and 24' at the ends extending entirely about the periphery of the body.

Figure 2:
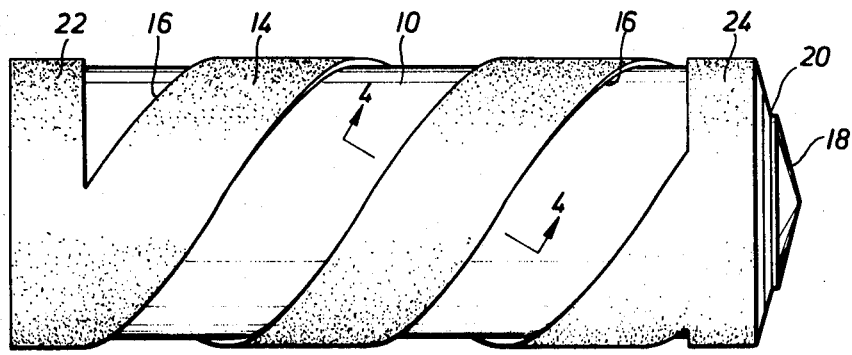
FIG. 2 is a side elevational view of the invention as illustrated in FIG. 1 showing the same before use in a pipe line.

In other respects the device as illustrated in FIG. 3 is similar to that of FIGS. 1 and 2.

Figure 4:
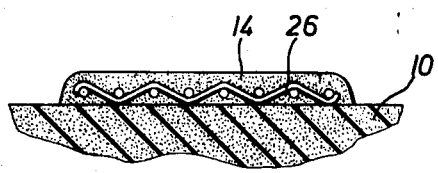
FIG. 4 is a cross-sectional view, on an enlarged scale, taken along the line 4—4 of FIG. 2, looking in the direction indicated by the arrows.

For the purpose of increasing the resistance of the covering to tearing and wear, due to contact with rough portions of the internal surface of the pipe, internal projections formed by weld deposits at joints, or the like, the covering may be provided with reenforcing means embedded therein, or applied thereto, as illustrated in FIG. 4, wherein the reenforcing means is shown as an embedded strip or element 26 formed of suitable material, such as wire mesh. The reenforcing strip or element may be embedded in the material of the plastic strip 14 before the strip is applied to the body, or the reenforcing means may first be applied to the body and the plastic cover applied thereover to enclose or embed the reenforcing material.

The reenforcing means may be of any suitable material, such as wire mesh, glass cloth, flat strip metal, or other suitable type of reenforcing.

In making use of the pig or swipe, the pig is inserted in the pipeline, by forcing it in place to form a tight seal between the pig and the internal surface of the pipe, the body 10 being more or less compressed during insertion. The pig is then propelled through the line by a pressure gradient therein. It will be apparent that fluid in the line in advance of the pig will be effectively maintained separate from the fluid following the same by means of the barrier 12, while the body projecting through the openings 10, and the adjacent portions of the surrounding covering 14, will wipe the internal surface of the pipe as the pig passes therethrough. Due to the relatively durable character of the covering material and the reenforcing of the same, the body will be effectively protected against tearing and wear by contact with rough places in the pipe, or with internal projections therein, such as might be formed by weld deposits, or the like. At the same time the pig will be sufficiently flexible and resilient to readily conform to the shape of bends and pass through restrictions or misshapen portions of the line without disrupting the pig.

It will also be apparent that fluid in the line may enter the sponge-like body of the pig, so that the pig will not collapse or be compressed to a smaller diameter than that of the pipe, while at the same time the pressure gradient in the pipe may exert a longitudinal compressive force on the pig tending to maintain the same in tight sealing contact with the internal surface of the pipe.

A preferred method of making the pig or swipe of the invention is illustrated in FIGS. 5 to 9, inclusive.

Figure 5:
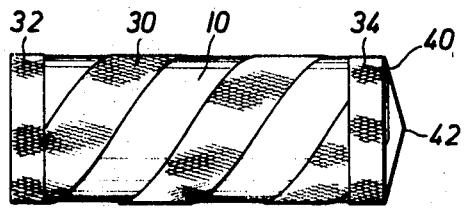
FIG. 5 is a side elevational view, on a reduced scale, of one of the pigs of the invention, illustrating a preliminary stage in a method of making the same.

In carrying out this method the body 10 of the pig may first be formed of foamed plastic, and a strip 30 of material, such as an adhesive tape, is applied to the exterior of the body by winding the same spirally about the body, as seen in FIG. 5, terminating the strip somewhat short of the ends of the body to leave exposed annular end portions 32 and 34 thereon, and an exposed spiral portion 36 between the turns of the tape. A narrow ring 38 of tape may also be applied to the forward end of the body, which ring is of smaller outer diameter than the diameter of the body, to leave an exposed annular end portion 40 thereon and an exposed circular, central, end area 42 thereon.

Figure 6:
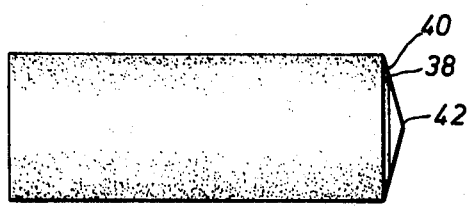
FIG. 6 is a view similar to that of FIG. 5 illustrating a further stage in the making of the pig.
Figure 7:
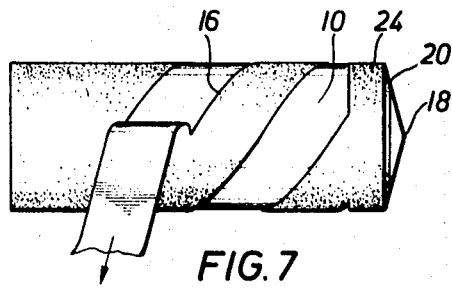
FIG. 7 is a view similar to that of FIG. 6 illustrating a step in the method of making the pig subsequent to the step of FIG. 6.

With the areas of the body which are to be left uncovered now covered by the tape, the entire device is coated with unfoamed plastic, as illustrated in FIG. 6, which may be allowed to partly set or cure, whereupon the tape is removed, as shown in FIG. 7, leaving the exposed areas of the form of the pig shown in FIG. 2.

Figure 8:
FIG. 8 is a view similar to that of FIG. 7, showing the pig in a further step of its manufacture following that of FIG. 7.
Figure 9:
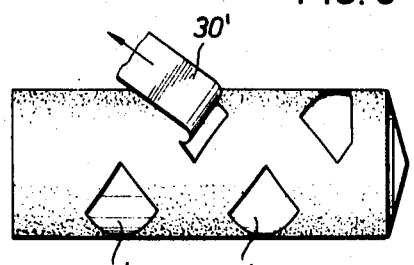
FIG. 9 is a view similar to that of FIG. 8, illustrating a further step in the manufacture of the pig subsequent to that of FIG. 8.

In making the form of the pig shown in FIG. 3, the coated body of FIG. 7 with the tape 30 removed is wound with another strip of tape 30' wound in the opposite direction to that of the tape 30 to form the criss-cross pattern shown in FIG. 8. The body thus wound is then again coated with plastic and the tape removed therefrom beefore the plastic has completely set or cured, leaving the openings 16' as seen in FIG. 9.

It will be apparent that the method illustrated in FIGS. 5 to 9, inclusive may also be carried out by winding the tape 30 on the body with a strip of the reenforcing material, such as the mesh 26, glass cloth, or the like wound on the body in the exposed area left by the tape, after which the entire device may be coated with plastic to embed the reenforcing means, whereupon the tape is removed before the plastic has set, leaving the spiral of reenforced plastic on the body with the spiral area of exposed body between the turns of the reenforced plastic.

The form of the pig illustrated in FIG. 3, may also be similarly formed with the criss-crossed reenforced plastic strips, leaving the openings 16' by suitably winding the reenforcing material in a criss-cross manner with the previously applied reenforced plastic strip and similarly applying tape spirally between the thus applied reenforcing, whereupon the entire device may again be coated and the tape removed before setting takes place, to leave the openings 16'.

The external covering of the pig may, of course, be formed with a single spiral or with several spiral arranged in a criss-cross pattern, and when formed with more than one spiral, these may be of different pitch, so that any grooves formed, as a result of rotation of the pig in its movement along the pipe line, in material, such as paraffin, or the like, deposited on the internal surface of the pipe, will be scraped or cut away by the spiral of different pitch as the pig moves along the line.

Figure 10:
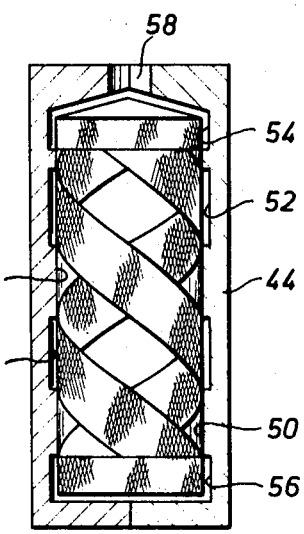
FIG. 10 is a side elevational view, on a reduced scale, of one part of a two part mold used in the manufacture of the pig of the invention, looking into the interior thereof and illustrating one stage of the manufacture of the pig by a molding process.
Figure 11:
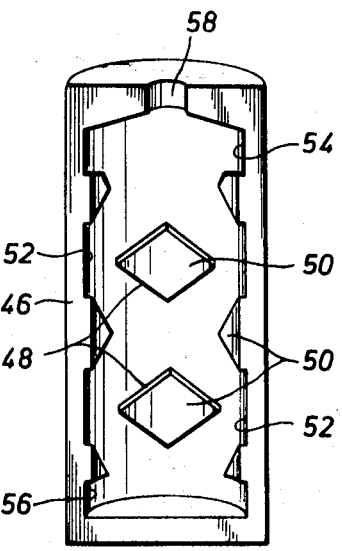
FIG. 11 is a side elevational view, on a reduced scale, of the other part of the two part mold showing the internal structure of the same.

A somewhat different method of making the pigs of the invention, and a preferred form of apparatus for use in carrying out the same, is illustrated in FIGS. 10 and 11.

In this form of the invention, a mold is provided, which may conveniently be formed in two parts 44 and 46, which when assembled form a hollow, generally cylindrical casing into which foam plastic, such as polyurethane may be poured. The mold parts are formed with internal projections 48, suitably shaped and positioned, and having inner face portions 50 disposed on a common cylindrical surface to form therebetween recessed areas or passageways 52. The recessed portions at the ends of the mold may be of annular shape, as shown at 54 and 56, while the recessed portions between such end portions may be arranged in spiral configuration.

By this arrangement, reenforcing strip material may be placed in the recessed portions 52, 54 and 56, as shown in FIG. 10 and the mold closed, whereupon unfoamed plastic may be introduced into the mold, through a suitable opening, such as that shown at 58 to fill the recessed portions 52, 54 and 56 and embed the reenforcing material. With the reenforcing material thus embedded, the interior of the mold may be filled with foamed plastic to form the internal body of the pig, to which the reenforced strip will be securely adhered, the inner faces 50 of the projections 48 being positioned to form openings, such as the openings 16' of the pig of FIG. 3 in which the external surface of the foamed body will be exposed.

It will be appreciated that the reenforcing material may first be embedded in unfoamed plastic to form strips, not shown, which may be spirally disposed in criss-cross relation or otherwise in a mold, also not shown, whose internal surface is cylindrical without the recesses 52, 54 and 56 or projections 48, and the foamed plastic may then be poured in to fill the mold.

The molding apparatus may also be used by inserting the reenforcing material in the recesses of the mold and placing a preformed foamed plastic body therein inside of the reenforcing material, after which unfoamed plastic may be introduced into the recesses, externally of the body to embed the reenforcing material and form the coating or cover on the body.

It will thus be seen that the invention provides a pipeline pig or swipe of durable construction, having sufficient flexibility and resilience to conform readily to irregularities in the shape of the pipe and to pass readily through bends and restrictions therein, while effectively resisting wear and tear due to internal roughness or projections in the line.

The invention is disclosed herein in connection with certain embodiments of the same as well as specific steps for the manufacture thereof and a particular apparatus to be used therefor, which are intended by way of illustration, it being evident that various changes may be made within the spirit of the invention and the scope of the appended claim.

Having thus clearly shown and described the invention, what is claimed as new and desired to secure by Letters Patent is:

1. A pipe line pig adapted to be propelled through a pipe line by a pressure gradient comprising
   a generally cylindrical body of sponge-like foamed plastic material,
   a cover on said body formed of flexible, impervious plastic material covering one end of the body to close the body against the flow of fluid therethrough and having a portion positioned for coaction with the body and the surrounding internal surface of the pipe to close the pipe against the flow of fluid therein past the body, said cover including strip-like portions extending spirally about the cylindrical surface of the body to provide exposed external areas of said cylindrical surface, and
   a reenforcing fabric carried by said spiral portions.

References Cited

UNITED STATES PATENTS 3,277,508 10/1966 Knapp _____ 15—104.06
3,389,417 6/1968 Knapp et al. _____ 15—104.06

EDWARD L. ROBERTS, Primary Examiner